United States Patent
Koshiro et al.

(10) Patent No.: US 12,295,910 B2
(45) Date of Patent: May 13, 2025

(54) RESIN CONTAINER AND RESIN CONTAINER CONNECTED BODY

(71) Applicant: Rohto Pharmaceutical Co., Ltd., Osaka (JP)

(72) Inventors: Hiroyuki Koshiro, Osaka (JP); Naohiro Ikeda, Osaka (JP)

(73) Assignee: Rohto Pharmaceutical Co., Ltd., Osaka (JP)

( * ) Notice: Subject to any disclaimer, the term of this patent is extended or adjusted under 35 U.S.C. 154(b) by 377 days.

(21) Appl. No.: 17/770,298

(22) PCT Filed: Oct. 21, 2019

(86) PCT No.: PCT/JP2019/041316
§ 371 (c)(1),
(2) Date: Oct. 27, 2022

(87) PCT Pub. No.: WO2021/079404
PCT Pub. Date: Apr. 29, 2021

(65) Prior Publication Data
US 2023/0094229 A1    Mar. 30, 2023

(51) Int. Cl.
*A61J 1/06* (2006.01)
*A61J 1/14* (2023.01)
*B32B 27/08* (2006.01)
*B32B 27/32* (2006.01)
*B65D 1/09* (2006.01)

(52) U.S. Cl.
CPC ............ *A61J 1/067* (2013.01); *A61J 1/1412* (2013.01); *B32B 27/08* (2013.01); *B32B 27/325* (2013.01);
(Continued)

(58) Field of Classification Search
CPC ......... A61J 1/067; A61J 1/1412; B32B 27/08; B32B 27/325; B32B 2250/02;
(Continued)

(56) References Cited

U.S. PATENT DOCUMENTS

| | | | |
|---|---|---|---|
| 2006/0229583 A1 | 10/2006 | Nagao et al. | |
| 2013/0087471 A1* | 4/2013 | Huber-Haag | B65D 77/08 53/436 |
| 2020/0122898 A1* | 4/2020 | Ikeda | B65D 1/0207 |

FOREIGN PATENT DOCUMENTS

| | | |
|---|---|---|
| CN | 104136019 A | 11/2014 |
| CN | 105612208 A | 5/2016 |

(Continued)

OTHER PUBLICATIONS

International Search Report issued in corresponding International Patent Application No. PCT/JP2019/041316 dated Dec. 10, 2019.
(Continued)

*Primary Examiner* — Ishal Pancholi
(74) *Attorney, Agent, or Firm* — Morgan, Lewis & Bockius LLP

(57) ABSTRACT

The present invention is a resin container having a multi-layer structure including a first layer that comes into contact with liquid content and a second layer that is in contact with the first layer from an outer side of the first layer. The first layer includes a cyclic olefin copolymer and a linear low-density polyethylene resin, and the second layer includes a low-density polyethylene resin.

10 Claims, 4 Drawing Sheets

(52) U.S. Cl.
CPC .......... B65D 1/095 (2013.01); *B32B 2250/02* (2013.01); *B32B 2250/242* (2013.01); *B32B 2270/00* (2013.01); *B32B 2323/046* (2013.01); *B32B 2439/80* (2013.01)

(58) Field of Classification Search
CPC .......... B32B 2250/242; B32B 2270/00; B32B 2323/046; B32B 2439/80; B32B 27/32; B32B 2307/30; B32B 2439/02
See application file for complete search history.

(56) References Cited

FOREIGN PATENT DOCUMENTS

| | | |
|---|---|---|
| JP | 2000-238847 A | 9/2000 |
| JP | 2008-104868 A | 5/2008 |
| JP | WO2009/131192 A1 | 10/2009 |
| JP | 2012-135621 A | 7/2012 |
| JP | 2015-030464 A | 2/2015 |
| JP | 2015-123993 A | 7/2015 |
| JP | 2017-013305 A | 1/2017 |
| TW | 201841597 A | 12/2018 |
| WO | 2009/113177 A1 | 9/2009 |
| WO | 2009/131192 A1 | 10/2009 |
| WO | 2017/115752 A1 | 7/2017 |
| WO | 2018/190422 A1 | 10/2018 |

OTHER PUBLICATIONS

International Preliminary Report on Patentability and Written Opinion issued in corresponding International Patent Application No. PCT/JP2019/041316 dated May 5, 2022.

* cited by examiner

RESIN CONTAINER AND RESIN CONTAINER CONNECTED BODY

TECHNICAL FIELD

The present invention relates to a resin container and a resin container connected body. More specifically, the present invention relates to a resin container provided with a storage portion configured to store liquid content and a resin container connected body provided with a connected body having a configuration in which a plurality of the resin containers are connected together.

BACKGROUND ART

Various types of known resin containers are widely used for storing liquid content.

One example of a known resin container is a plastic ampoule for storing chemicals in a sealed state.

As such a plastic ampoule, a plastic ampoule manufactured using a blow-fill-seal method such as described in Patent Document 1 is known.

CITATION LIST

Patent Literature

Patent Document 1: Domestic republication of PCT international application No. 2009/131192

SUMMARY OF INVENTION

Technical Problem

Known examples of resins used to form resin containers include cyclic olefin polymers (COP) obtained via polymerization of norbornene-based monomers, and cyclic olefin copolymers (COC) obtained via copolymerization of norbornene-based monomers and ethylene.

However, these resins have high thermal deformation temperatures and are harder than other olefin-based resins such as polyethylene resin. Thus, these resins cannot be considered satisfactory in terms of having sufficient moldability.

When using a resin container provided with an outlet for expelling liquid content to the outside, the liquid content may not be sufficiently expelled by only the pressure from its own weight acting on the liquid content when the outlet is pointed downward.

Thus, there is a demand for a resin container configured to easily deform under compression to decrease the internal volume and allow external pressure to act on the liquid content.

However, as described above, the resins in containers made of a cyclic olefin polymer and in containers made of a cyclic olefin copolymer are relatively hard. Thus, it is difficult to say that they provide sufficiently easy control in terms of expelling liquid content.

To solve such problems, one plausible approach is to configure the container as a multilayer structure having two or more layers, with the resin used in the outer layer being softer than the resin used in the inner layer.

However, configuring the resin container having a multilayer structure may cause a new problem of inter-layer peeling.

Thus, to solve such problems, the present invention is directed at providing a resin container with which liquid content is easily removed and a resin container connected body provided with a connected body having a configuration in which a plurality of the resin containers are connected together.

Solution to Problem

To solve the problems described above, the present invention provided is a resin container including a container body including a storage portion configured to store liquid content and an outlet for the liquid content; and a lid configured to seal the container body by blocking the outlet, wherein the container body and the lid are made of a resin, the container body has a multilayer structure including a first layer being an innermost layer that comes into contact with the liquid content and a second layer that is in contact with the first layer from an outer side of the first layer, the first layer includes a cyclic olefin copolymer and a linear low-density polyethylene resin, with more of the cyclic olefin copolymer being included than the linear low-density polyethylene resin, and the second layer includes a low-density polyethylene resin.

DESCRIPTION OF EMBODIMENTS

Hereinafter, embodiments of a resin container of the present invention will be described with reference to the drawings.

A connected body including a plurality of connected resin containers is used as an example of an embodiment of the present invention in the following description.

Figure 1:
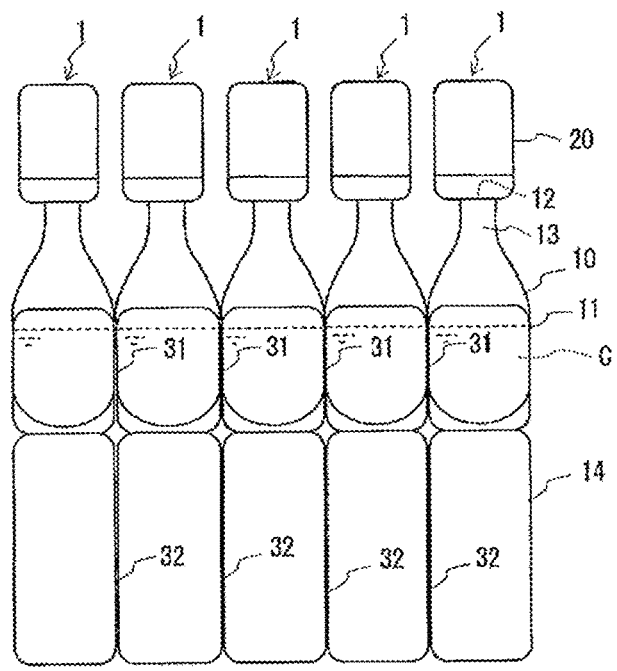
FIG. 1 is a front view illustrating a connected body including a plurality of connected resin containers that are each provided with a container body and a lid.

FIG. 1 is a diagram illustrating a connected body 100 formed of five connected resin containers 1.

As also illustrated in this diagram, the resin container 1 of the present embodiment is provided with a container body 10 including a storage portion 11 configured to store liquid content C and an outlet 12 for the liquid content C.

As illustrated in FIGS. 1 to 5, the resin container 1 according to the present embodiment is further provided with a lid 20 made of resin. The lid 20 seals the container body 10 by blocking the outlet 12 of the container body 10.

The resin container 1 according to the present embodiment includes the lid 20 and the container body 10 that are integrally formed and is configured such that the outlet 12 appears when the lid 20 is broken off from the container body 10.

That is, the resin container 1 according to the present embodiment can be opened by breaking the resin container 1 between the lid 20 and the container body 10 and detaching the lid 20 from the container body 10.

In the present embodiment, the connected body 100 is formed of the plurality of resin containers 1, each provided with the container body 10 and the lid 20, connected together.

In the connected body 100 of the present embodiment, the plurality of container bodies 10 are disposed side by side in a row with an opening direction of the outlets 12 facing upward, and the connected body 100 includes a connecting portion disposed between two adjacent resin containers 1 in the side by side direction, the connecting portion connecting the adjacent resin containers 1.

In other words, in the connected body 100, the plurality of resin containers 1 are connected via the connecting portions provided on the side edge portions of each resin container 1.

The connecting portions may connect the adjacent container bodies 10 via a point connection or via a linear connection. Alternatively, the connecting portions may connect the adjacent lids 20 via a point connection or via a linear connection.

In other words, the connection state of the connecting portions is not particularly limited.

In the connected body 100 exemplified in the present embodiment, the container bodies 10 are connected via connecting portions 31 and 32 that extend vertically along the side edge portions of the container bodies 10.

In the present embodiment, each resin container 1 provided with the container body 10 and the lid 20 is an integrally formed article, and the connected body 100 is also an integrally formed article. Thus, the plurality of resin containers 1 can be separated one by one by breaking the connecting portions 31 and 32.

The container body 10 of the present embodiment is not particularly limited in terms of the internal volume of the container body 10 when sealed with the lid 20. However, the internal volume may be 10 mL or less at room temperature (for example, 23° C.) and at normal pressure (for example, 1.0 atm), for example.

The internal volume in the present embodiment may be 8 mL or less, 6 mL or less, or 4 mL or less.

The internal volume may be 0.1 mL or greater or 0.2 mL or greater.

The internal volume may be 0.3 mL or greater or 0.4 mL or greater.

The internal volume preferably ranges from 0.1 mL to 10 mL.

The storage portion 11 of the container body 10 according to the present embodiment is cylindrical with a closed bottom.

The storage portion 11 is provided with a bottom portion 11a forming a lower end portion in the vertical direction, an equal diameter portion 11b connected to the upper side of the bottom portion 11a, and a reduced diameter portion 11c connected to the upper side of the equal diameter portion 11b.

The bottom portion 11a of the present embodiment has a mortar shape or a bowl shape that decreases in diameter toward the bottom edge, and the equal diameter portion 11b has a cylindrical shape with a substantially constant cross-sectional shape (inner diameter) when sectioned along the horizontal plane.

The reduced diameter portion 11c is formed to have a cross-sectional shape (inner diameter) that has an increasingly smaller diameter toward the top when sectioned along the horizontal plane.

The container body 10 of the present embodiment includes a nozzle portion 13 that has a cylindrical shape and extends upward from the upper end of the reduced diameter portion 11b. The upper end opening of the nozzle portion 13 corresponds to the outlet 12.

The liquid content C of the resin container 1 of the present embodiment can be expelled by tipping the container body 10 with the lid 20 removed and in an open state upside down so that the outlet 12 is pointing downward, and squeezing the storage portion 11 with fingertips from front to back to apply pressure to the storage portion 11 and discharge the liquid content C via the outlet 12.

The resin container 1 exemplified in the present embodiment is a drop-dispensing container configured to dispense drops of the liquid content C from the outlet 12 when the container is in an open state.

Also, the container body 10 of the present embodiment is flexible due to the excellent flexibility of the storage portion 11. This allows the amount of the liquid content C dispensed from the outlet 12 to be easily adjusted by adjusting the applied pressure or the like.

To provide an appropriate amount of resistance while the liquid content C moves from the storage portion 11 to the outlet 12 and facilitate adjustment of the dispensed amount of the liquid content C, the nozzle portion 13 is preferably formed with an inner diameter (diameter of the flow path of the liquid content C) ranging from 0.5 mm to 6.0 mm.

The inner diameter is more preferably 0.7 mm or greater, even more preferably 0.9 mm or greater, and particularly preferably 1.0 mm or greater.

The inner diameter may be 5.5 mm or less, 5.0 mm or less, 4.5 mm or less, 4.0 mm or less, 3.5 mm or less, or 3.0 mm or less, and is more preferably 2.8 mm or less, further preferably 2.5 mm or less, even further preferably 2.0 mm or less, and particularly preferably 1.8 mm or less.

Typically, the inner diameter can be determined by determining the cross-sectional area of a shape defined by the inner surface of the nozzle portion 13 when the nozzle portion 13 is sectioned along a plane orthogonal to the flow direction of the liquid content C and taking the diameter of a circle having the same area as the cross-sectional area.

The nozzle portion 13 is preferably provided with a portion that preferably has an inner diameter such as that described above with a length ranging from 0.5 mm to 12 mm.

The length is more preferably 0.7 mm or greater and even more preferably 0.9 mm or greater.

The length is more preferably 10 mm or less and even more preferably 8 mm or less.

Note that the container body 10 may not include the nozzle portion 13.

Alternatively, the container body 10 may include the outlet 12 drilled directly into the storage portion 11.

The container body 10 of the present embodiment further includes a holding portion 14 having a hollow rectangular plate-like shape and extending downward from the lower end of the storage portion 11.

More specifically, in the container body 10 of the present embodiment, the storage portion 11 and the nozzle portion 13 merge to form a bottle shape above the hollow plate-like holding portion 14 having a long rectangular shape in a front view.

Note that in the container body 10 of the present embodiment, only the bottle-shaped portion is the portion that can store the liquid content C, and the hollow portion of the holding portion 14 is a space that is isolated from and not connected to the internal space of the storage portion 11.

Here, the internal volume of the container body 10 refers to the volume of the portion that can store the liquid content C and does not include the volume of the hollow portion of the holding portion 14.

As described above, because the rectangular plate-like holding portion 14 is provided in the present embodiment, information such as the product name and expiration date can be displayed on the holding portion 14.

Note that in a case where a larger volume of the storage portion 11 is preferable, the holding portion 14 may be made smaller or removed, as necessary.

In the connected body 100 according to the present embodiment, adjacent resin containers 1 are connected so that five resin containers 1 are connected via a first connecting portion 31 that connects the side edges of the equal diameter portions 11a so that the connection region extends linearly and vertically and a second connecting portion 32 that connects the side edges of the holding portions 14 so that the connection region extends linearly and vertically.

The connected body 100 according to the present embodiment is a molded article manufactured by a blow-fill-seal method as described below.

Accordingly, the resin container 1 according to the present embodiment can suppress foreign matter contamination when the liquid content C is stored in the storage portion 11.

Also, the resin container 1 according to the present embodiment is used as a unit dose container containing a small amount of the liquid content C as described above.

Figure 2:
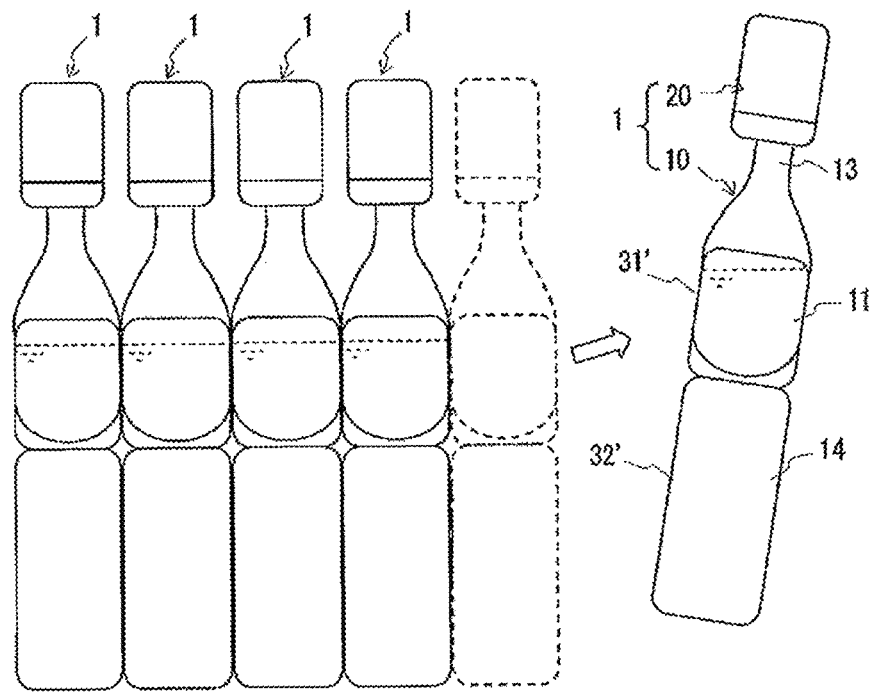
FIG. 2 is a front view illustrating one of the resin containers provided with the container body and the lid being separated from the connected body.
Figure 3:
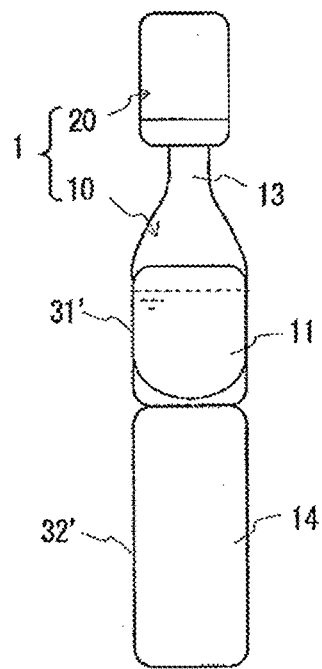
FIG. 3 is a front view illustrating one of the resin containers separated from the connected body.
Figure 4:
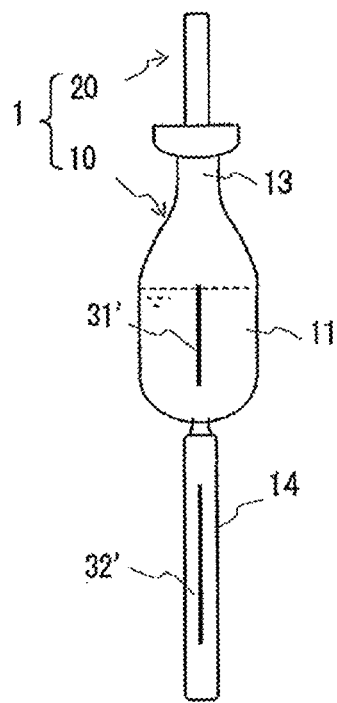
FIG. 4 is a side view illustrating one of the resin containers separated from the connected body.
Figure 5:
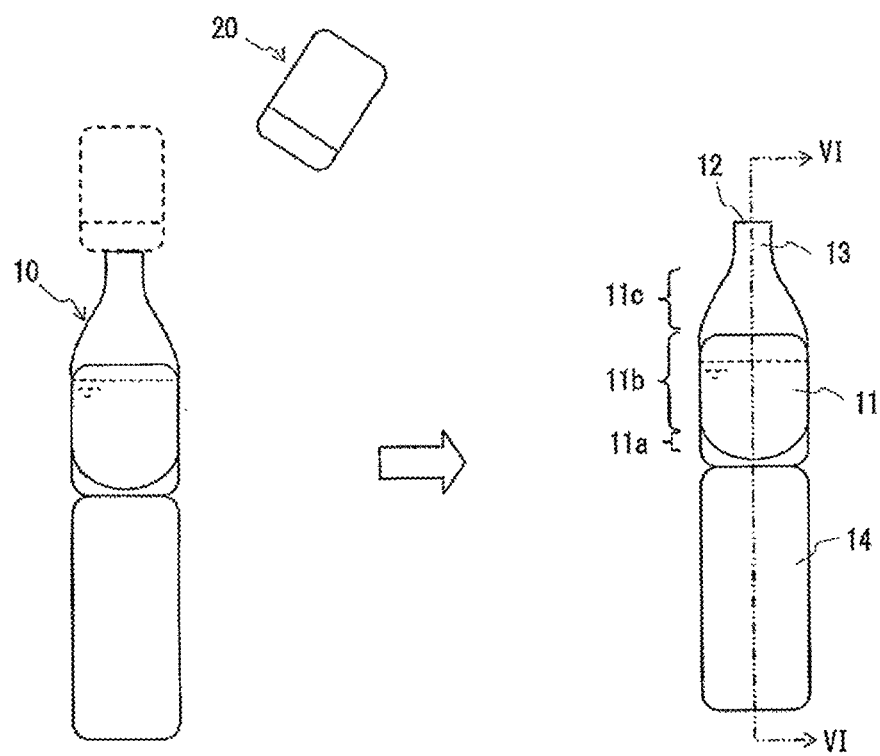
FIG. 5 is a front view illustrating the resin container being opened.

As illustrated in FIG. 2, the process for expelling the liquid content C from the resin container 1 includes, first, breaking the connecting portions of the connected body 100 at the first connecting portion 31 and the second connecting portion 32, removing a single resin container 1 from the connected body 100, and then, as illustrated in FIG. 5, removing the lid 20 from the resin container 1 removed from the connected body 100 to place the container body 10 in an open state.

The connected body 100 of the present embodiment is configured such that the connecting portions 31 and 32 can be broken without using a tool, such as scissors or a utility knife, and can be broken with just hand strength by applying force to pull apart adjacent resin containers 1.

Furthermore, the container body 10 and the lid 20 of the resin container 1 of the present embodiment can be broken apart by tearing with the hand without using a tool.

Generally, it is known that, when a polyethylene resin sheet is torn, thread-like burrs (projections) tend to form on the broken surface. In a case where the resin container 1 of the present embodiment is formed of only polyethylene resin, burrs may form at the sections corresponding to connecting portions 31' and 32' and the peripheral edge portion of the outlet 12 after breakage.

Conventionally, in a case where a single resin container is broken off from a connected body, blade-teeth-like ridges and grooves tend to form on the connecting portions 31' and 32' after breakage, or burrs tend to form on the peripheral edge portion of the outlet after breakage.

The ridges and grooves at the connecting portions 31' and 32' after breakage may negatively affect the tactile sensation when the resin container is held.

Also, burrs at the peripheral edge portion of the outlet may prevent the drops of the liquid content from being dispensed by normally dropping due to gravity.

However, in the present embodiment, the problems described above can be suppressed by configuring the resin container 1 of a specific material.

Figure 6:
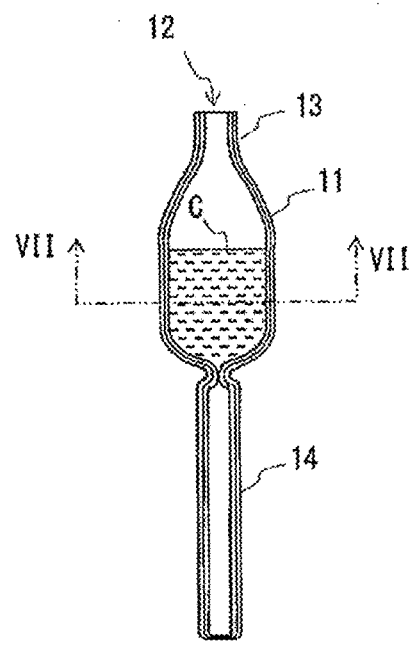
FIG. 6 is a cross-sectional view illustrating a cross-section taken along line VI-VI in FIG. 5.
Figure 7:
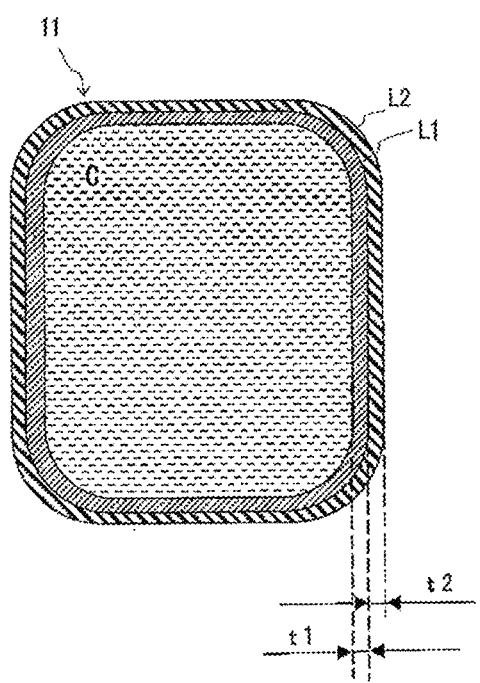
FIG. 7 is an enlarged cross-sectional view illustrating a cross-section taken along line VII-VII in FIG. 6.

As illustrated in FIGS. 6, 7, and other figures, in the present embodiment, the container body 10 has a multilayer structure including a first layer L1, which is the innermost layer that comes into contact with the liquid content C, and a second layer L2, which is in contact with the first layer L1 from an outer side of the first layer L1. The first layer L1 contains a cyclic olefin copolymer (COC) and a linear low-density polyethylene (PE-LLD) resin, and the second layer contains a low-density polyethylene (PE-LD) resin.

The first layer L1 functions as described above due to containing the cyclic olefin copolymer (COC). However, depending on the shape and/or dimensions of the container body, the first layer L1 may not be soft and may provide resistance when the storage portion 11 is squeezed by fingertips and deformed under compression to reduce the internal volume.

To solve this, in the present embodiment, the second layer that is in contact with the first layer L1 from an outer side of the first layer L1 is provided. Thus, with the second layer L2, the total thickness of the container body 10 can be kept at a constant value or increased even if the thickness of the first layer L1 is reduced.

Accordingly, in the present embodiment, a container thickness that can suppress leakage from the container body 10 caused by a pin hole or the like can be ensured and the hardness can be adjusted to an appropriate hardness that allows the container body to easily deform under compression.

In the present embodiment, the second layer L2 contains PE-LD and thus can impart flexibility to the container body 10.

Furthermore, in the present embodiment, because the first layer L1 contains both COC and PE-LLD, the affinity between the first layer L1 and the second layer L2 is greater than in a case where PE-LLD is not contained.

Thus, when the first layer L1 and the second layer L2 are thermally fused together and the layers are integrally formed, excellent adhesiveness is exhibited between the layers, which can suppress inter-layer peeling.

For the PE-LLD contained in the first layer L1, a typical PE-LLD can be used with ethylene as the main monomer and an α-olefin having 4 or more carbon atoms (for example, 1-butene, 1-hexene, 1-octene, 4-methylpentene-1, or the like) as the comonomer.

The PE-LLD preferably contains 1-hexene or 1-octene as the comonomer, and more preferably contains 1-hexene as the comonomer from the perspective of obtaining the effect of the present invention to a significant degree.

With the PE-LLD, preferably, the comonomer introduces a short chain branch in the molecular structure, the degree of crystallinity is reduced, and low density is achieved.

The short chain branch is preferably introduced at a ratio of from 5 to 100 per 1000 units of structural units of ethylene and is more preferably introduced at a ratio of from 10 to 50.

In other words, the proportion of the comonomer with respect to the total amount of ethylene and the comonomer in the PE-LLD preferably ranges from 0.5 mol % to 10 mol % and more preferably ranges from 1 mol % to 5 mol %.

Also, the PE-LLD preferably has a density of 910 kg/m$^3$ or greater and more preferably has a density of 915 kg/m$^3$ or greater.

The density of the PE-LLD is preferably 930 kg/m$^3$ or less.

The melt mass flow rate (MFR) of the PE-LLD is preferably 0.5 g/10 min or greater and more preferably 0.6 g/10 min or greater.

The melt mass flow rate is preferably 5.0 g/10 min or less, more preferably 4.0 g/10 min or less, and even more preferably 3.0 g/10 min or less.

The melt mass flow rate of the PE-LLD and the PE-LD can be determined using method A (mass measuring method) according to JIS K7210:2014 "Plastics—Determination of the Melt Mass-flow Rate (MFR) and Melt Volume-flow Rate (MVR) of Thermoplastics—Part 1: Standard method" and can be determined under the conditions of a temperature of 190° C. and a certified load of 2.16 kg.

Similarly, the melt mass flow rate of the COC can be determined under the conditions of a temperature of 260° C. and a certified load of 2.16 kg.

The PE-LLD may be a polymerization product using a multi-site catalyst such as a Ziegler-Natta catalyst or may be a polymerization product using a single-site catalyst such as a metallocene catalyst.

The first layer L1 of the present embodiment contains only one type of PE-LLD, but may contain two or more types of PE-LLD.

The COC contained in the first layer L1 along with the PE-LLD as described above is obtained by addition copolymerization of one type or two or more types of a norbornene-based monomer and ethylene using a known method or by hydrogenation of these monomers via a standard method, and specifically has the structure represented by General Formula (1) below.

[Chemical Formula 1]

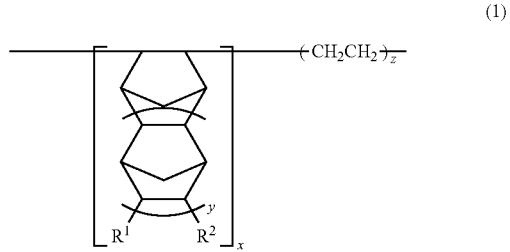

(1)

(where $R^1$ and $R^2$ in Formula (1) are the same or different and represent hydrogen, hydrocarbon residue, or a polar group of halogen, ester, nitrile, or pyridyl. $R^1$ and $R^2$ may be bonded to one another to form a ring. x and z are integers of 1 or greater, and y is an integer of 0 or 1 or greater)

The COC preferably has a glass transition temperature (Tg) of 60° C. or higher, more preferably 63° C. or higher, even more preferably 65° C. or higher, and yet even more preferably 67° C. or higher. The glass transition temperature (Tg) is preferably 130° C. or lower, more preferably 120° C. or lower, even more preferably 110° C. or lower, yet even more preferably 100° C. or lower, and particularly preferably 90° C. or lower.

Also, in the present specification, "glass transition temperature (Tg)" refers to the midpoint glass transition temperature identified by measuring under the conditions of a rate of temperature increase of 10° C./min in accordance with JIS K7121, unless otherwise indicated.

In a case where two or more types of COC are used, the Tg of the COC is identified in terms of a weighted average of each cyclic olefin resin.

From the perspective of the moldability of the resin container 1, the proportion of structural units derived from a norbornene-based monomer in the COC is preferably 70 mass % or less.

The proportion is more preferably 68 mass % or less, even more preferably 66 mass % or less, and particularly preferably 64 mass % or less.

The proportion is preferably 15 mass % or greater, more preferably 18 mass % or greater, even more preferably 20 mass % or greater, and particularly preferably 22 mass % or greater.

Specific examples of polymers with structural units represented by the above-described General Formula (1) include trade name Apel (trademark) available from Mitsui Chemicals, Inc., and trade name TOPAS (trademark) available from Advanced Polymers GmbH.

From the perspective of the moldability and the mechanical properties and the like of the molded product, the COC preferably has a melt flow rate (MFR (260° C., 2.16 kg)) ranging from 10 g/10 min to 40 g/10 min.

The COC and the PE-LLD are preferably blended so that, when the glass transition temperature of the first layer L1 is measured, the glass transition temperature ranges from 60° C. to 130° C. The glass transition temperature (Tg) is preferably 60° C. or higher, more preferably 63° C. or higher, even more preferably 65° C. or higher, and yet even more preferably 67° C. or higher. The glass transition temperature (Tg) is preferably 130° C. or lower, more preferably 120° C. or lower, even more preferably 110° C. or lower, yet even more preferably 100° C. or lower, and particularly preferably 90° C. or lower.

The first layer of the present embodiment contains more of the COC than the PE-LLD.

The proportion of the COC with respect to the total amount of COC and PE-LLD contained in the first layer L1 is preferably greater than 50 mass %, more preferably 55 mass % or greater, and even more preferably 60 mass % or greater.

The proportion is preferably 95 mass % or less, more preferably 90 mass % or less, and even more preferably 85 mass % or less.

In other words, the proportion of the PE-LLD with respect to the total amount of COC and PE-LLD in the first layer L1 preferably ranges from 5 mass % to less than 50 mass %.

The resin container 1 of the present embodiment is formed via blow molding, and more specifically, is formed via a blow-fill-seal method.

Thus, for example, the resin container 1 can be manufactured using a method including blowing air into a high-temperature parison with the second layer L2 formed on the outer side such that the parison pressed, from the inside, outward comes into contact with the mold.

Note that the first layer L1 may contain, in addition to the COC and the PE-LLD, an additive component (a rubber or plastic chemical, a filling agent such as a filler, an antioxidant, other resins, and the like), but the contained amount is preferably 5 mass % or less, more preferably 3 mass % or less, and even more preferably 1 mass % or less.

It is particularly preferable that the first layer L1 contains essentially only the COC and the PE-LLD.

The second layer L2 that is in contact with the first layer L1 from an outer side of the first layer L1 and forms the container body 10 together with the first layer L1 includes a PE-LD.

The PE-LD forming the second layer L2 preferably has a density ranging from 910 kg/m³ to 930 kg/m³ and more preferably has a density ranging from 915 kg/m³ to 925 kg/m³.

As described above, the PE-LD preferably has a bulky molecular structure and includes many molecular chain entanglements.

Specifically, the PE-LD forming the second layer L2 is preferably a polymerized material obtained via high pressure polymerization with long chain branches present in the molecular structure.

The MFR (190° C., 2.16 kg) of the PE-LD is preferably 1.5 g/10 min or less, more preferably 1.3 g/10 min or less, even more preferably 1.1 g/10 min or less, and particularly preferably 1.0 g/10 min or less.

The MFR of the PE-LD is preferably 0.1 g/10 min or greater, more preferably 0.2 g/10 min or greater, and even more preferably 0.3 g/10 min or greater.

Note that the second layer L2 may contain in small amounts, in addition to the PE-LD, an additive component (a rubber or plastic chemical, a filling agent such as a filler, an antioxidant, a coloring agent, other resins, and the like), but the contained amount is preferably 5 mass % or less, more preferably 3 mass % or less, and even more preferably 1 mass % or less.

It is particularly preferable that the second layer L2 contains essentially only the PE-LD.

The thickness of the first layer L1 and the thickness of the second layer L2 varies depending on the applications of the resin container 1, but in the case of a small container with a capacity for the liquid content C in the storage portion 11 of 10 mL or less as described in the present embodiment, the total combined thickness is preferably set ranging from 0.15 mm to 1 mm.

Note that from the perspective of increasing the internal pressure inside the container to assist in removing the liquid content C from the outlet 12, the storage portion 11 is preferably thin and easy to deform. However, the storage portion 11 preferably also has a certain thickness or greater to help prevent the storage portion 11 from breaking.

The total thickness (t1+t2) of the thickness (t1) of the first layer L1 and the thickness (t2) of the second layer L2 is preferably 0.2 mm or greater, more preferably 0.24 mm or greater, and even more preferably 0.28 mm or greater, at least at the section of the storage portion 11 configured as the storage space of the liquid content C.

The total thickness (t1+t2) is preferably 0.8 mm or less, more preferably 0.7 mm or less, and even more preferably 0.6 mm or less.

The thickness (t1) of the first layer L1 preferably ranges from 0.05 mm to 0.4 mm, more preferably ranges from 0.1 mm to 0.35 mm, and even more preferably ranges from 0.15 mm to 0.30 mm.

The thickness (t2) of the second layer L2 preferably ranges from 0.1 mm to 0.6 mm, more preferably ranges from 0.1 mm to 0.55 mm, and even more preferably ranges from 0.15 mm to 0.5 mm.

The liquid content C stored in the storage portion 11 is not particularly limited, and examples thereof include food or drink products (beverages, seasoning, and the like), cosmetics (skin care agents, hair care agents, makeup cosmetics, and the like), pharmaceuticals (eye drops, nasal drops, oral medication, disinfectants, contact lens agents, nutritional supplements, gargles, repellents, and the like), and functional chemicals (detergents, softeners, fragrances, adhesives, and the like).

Among these, eye drops are suitably used as the liquid content C stored in the resin container 1 of the present embodiment for the reason that there is a demand for dispensing an appropriate amount of the liquid content C as drops.

In other words, the resin container 1 of the present embodiment is preferably an eye drop container.

The resin container 1 of the present embodiment may be manufactured via the blow-fill-seal method in which the resin container 1 is filled with the liquid content C as described above when the resin container 1 is manufactured.

The specific example described below is an example of how the resin container (connected body) of the present embodiment may be manufactured.

(1) Blow Process

A parison having a two layer structure is manufactured via extrusion with a melt-kneaded article obtained by melt-kneading the raw material (cyclic olefin copolymer (COC) and linear low-density polyethylene (PE-LLD) resin) for forming the first layer on the inner side and a melt-kneaded article obtained by melt-kneading the raw material (low-density polyethylene (PE-LD)) for forming the second layer on the outer side. Subsequently, the parison is sandwiched by a split mold formed so as to have a cavity corresponding to the shape of the connected body when the split mold is closed, air is forced inside the parison and/or the parison is sucked via vacuum holes formed in the molding surfaces of the split mold, and the parison is given the shape of each portion such as the storage portion and the holding portion.

At this stage, the lids are not formed, and a connected body in which the outlet of each resin container is open is manufactured.

(2) Fill Process

For example, a nozzle is inserted inside the storage portion of each resin container via the outlet, a predetermined amount of the liquid content is injected from the nozzle, and the liquid content is stored in the storage portion.

(3) Seal Process

After the predetermined amount of the liquid content is stored in the storage portion, the lid portion is formed to seal the outlet.

Note that the connected body of the present embodiment can be manufactured using a method other than that described above.

Also, in the present embodiment, the resin container is manufactured in a state forming the connected body. However, it is not necessary to manufacture the resin container in a state forming the connected body.

Furthermore, in the present embodiment, the connected body and the resin containers each have a specific shape. However, the resin container of the present invention is not limited to this example.

For example, in the present embodiment, the resin container has a two layer structure. However, the resin container of the present invention may have a structure of three or more layers further including a separate functional layer (gas permeation prevention layer, steam permeation prevention layer, light transmission prevention layer, or content permeation prevention layer) on the outer side of the second layer.

In this manner, the present invention is not limited to the examples described above in any way.

The resin container according to the present embodiment is configured as described above and thus has the following advantages.

In other words, a resin container according to the present embodiment includes a container body including a storage portion configured to store liquid content and an outlet for the liquid content; and a lid configured to seal the container body by blocking the outlet, wherein the container body and the lid are made of a resin, the container body has a multilayer structure including a first layer being an innermost layer that comes into contact with the liquid content and a second layer that is in contact with the first layer from an outer side of the first layer, the first layer includes a cyclic olefin copolymer and a linear low-density polyethylene resin, with more of the cyclic olefin copolymer being included than the linear low-density polyethylene resin, and the second layer includes a low-density polyethylene resin.

With the resin container according to the present embodiment, the liquid content is easily expelled.

Note that the resin container according to the present invention is not limited to the above-described embodiment. Furthermore, the resin container according to the present invention is not limited by the above-described effects. Various modifications can be made to the resin container according to the present invention without departing from the spirit of the present invention.

EXAMPLES

The present invention will now be described in further detail using Examples, but the present invention is not limited to the Examples.

Resin containers forming a connected body were manufactured as illustrated in FIG. 1, and evaluation relating to smoothness of the broken surface, inter-layer peeling, ease of pressing, moldability, and component preservation was performed.

Note that the raw materials used in these evaluations are as follows.
Test Materials
COC1:
Cyclic olefin copolymer (glass transition temperature of 78° C., density of 1010 kg/m$^3$, melt flow rate of 32 g/10 min (260° C.), trade name "TOPAS 8007S" (available from Polyplastics Co., Ltd.))

COC2:
Cyclic olefin copolymer (glass transition temperature of 80° C., density of 1020 kg/m$^3$, melt flow rate of 30 g/10 min (260° C.), trade name "APEL APL6509T" (available from Mitsui Chemicals, Inc.)) PE-LLD:
Linear low-density polyethylene (density of 920 kg/m$^3$, melt flow rate of 0.95 g/10 min (190° C.)) PE-LD:
Low-density polyethylene (density of 922 kg/m$^3$, melt flow rate of 0.60 g/10 min (190° C.))
Evaluation
Evaluation 1: Smoothness of Broken Surface
A resin container having a two layer structure including a first layer (inner layer) containing a cyclic olefin copolymer and a linear low-density polyethylene or a low-density polyethylene at the compounding ratio (%) indicated in Table 1 and a second layer (outer layer) containing a low-density polyethylene was manufactured.

The resin containers were manufactured using a blow-fill-seal method to form a connected body including five connected resin containers, and a storage portion with a capacity of 1 mL was filled with 0.5 mL of purified water. Fingers were used to break off each resin container from the manufactured connected body.

A fingertip was run along one segmented surface (the connecting portions 31' and 32' after breakage) two times, and the smoothness of the separated surface was determined according to the following criteria.

The results are listed in Table 1.

○: No rough feeling accompanied by pain at the fingertip for any of the connecting portions after breakage.

X: Rough feeling accompanied by pain at the fingertip for one or more of the connecting portions after breakage.

TABLE 1

| | | Comparative Example 1 | Comparative Example 2 | Comparative Example 3 | Comparative Example 4 | Example 1 | Example 2 | Example 3 | Example 4 | Example 5 | Example 6 | Example 7 | Example 8 | Example 9 |
|---|---|---|---|---|---|---|---|---|---|---|---|---|---|---|
| First layer | COC1 | 100 | 50 | 80 | 70 | 97 | 90 | 80 | 70 | 60 | 80 | 80 | 70 | 70 |
| | PE-LLD | — | 50 | — | — | 3 | 10 | 20 | 30 | 40 | 20 | 20 | 30 | 30 |
| | PE-LD | — | — | 20 | 30 | — | — | — | — | — | — | — | — | — |
| Second layer | PE-LD | 100 | 100 | 100 | 100 | 100 | 100 | 100 | 100 | 100 | 100 | 100 | 100 | 100 |
| First layer thickness (mm) | | 0.1 | 0.1 | 0.1 | 0.1 | 0.1 | 0.1 | 0.1 | 0.1 | 0.1 | 0.2 | 0.3 | 0.2 | 0.3 |
| Second layer thickness (mm) | | 0.3 | 0.3 | 0.3 | 0.3 | 0.3 | 0.3 | 0.3 | 0.3 | 0.3 | 0.2 | 0.1 | 0.2 | 0.1 |
| Smoothness of broken surface | | X | ○ | X | X | ○ | ○ | ○ | ○ | ○ | ○ | ○ | ○ | ○ |
| Inter-layer peeling | | X | ○ | ○ | ○ | ○ | ○ | ○ | ○ | ○ | ○ | ○ | ○ | ○ |
| Ease of pressing | | X | ○ | X | X | Δ | Δ | ○ | ○ | ○ | Δ | Δ | Δ | Δ |
| Moldability | | X | X | ○ | ○ | ○ | ○ | ○ | ○ | ○ | ○ | ○ | ○ | ○ |
| Component preservation | | ○ | X | ○ | ○ | ○ | ○ | ○ | ○ | Δ | ○ | ○ | ○ | ○ |

| | | Comparative Example 5 | Comparative Example 6 | Comparative Example 7 | Comparative Example 8 | Example 10 | Example 11 | Example 12 | Example 13 | Example 14 | Example 15 | Example 16 | Example 17 | Example 18 |
|---|---|---|---|---|---|---|---|---|---|---|---|---|---|---|
| First layer | COC2 | 100 | 50 | 80 | 70 | 97 | 90 | 80 | 70 | 60 | 80 | 80 | 70 | 70 |
| | PE-LLD | — | 50 | — | — | 3 | 10 | 20 | 30 | 40 | 20 | 20 | 30 | 30 |
| | PE-LD | — | — | 20 | 30 | — | — | — | — | — | — | — | — | — |

TABLE 1-continued

| | | | | | | | | | | | | | |
|---|---|---|---|---|---|---|---|---|---|---|---|---|---|
| Second PE-layer LD | 100 | 100 | 100 | 100 | 100 | 100 | 100 | 100 | 100 | 100 | 100 | 100 | 100 |
| First layer thickness (mm) | 0.1 | 0.1 | 0.1 | 0.1 | 0.1 | 0.1 | 0.1 | 0.1 | 0.1 | 0.2 | 0.3 | 0.2 | 0.3 |
| Second layer thickness (mm) | 0.3 | 0.3 | 0.3 | 0.3 | 0.3 | 0.3 | 0.3 | 0.3 | 0.3 | 0.2 | 0.1 | 0.2 | 0.1 |
| Smoothness of broken surface | X | ○ | X | X | ○ | ○ | ○ | ○ | ○ | ○ | ○ | ○ | ○ |
| Inter-layer peeling | X | ○ | ○ | ○ | ○ | ○ | ○ | ○ | ○ | ○ | ○ | ○ | ○ |
| Ease of pressing | X | ○ | X | X | Δ | Δ | ○ | ○ | ○ | Δ | Δ | Δ | Δ |
| Moldability | X | X | ○ | ○ | ○ | ○ | ○ | ○ | ○ | ○ | ○ | ○ | ○ |
| Component preservation | ○ | X | ○ | ○ | ○ | ○ | ○ | ○ | Δ | ○ | ○ | ○ | ○ |

Evaluation 2: Inter-layer Peeling

A connected body with purified water sealed inside was manufactured as in Evaluation 1, and the connecting portions were segmented with a finger, separating each of the resin containers.

The lid of the resin container was twisted off to form an opening, and the purified water was discharged.

With the outlet pointing upward, a utility knife was used to cut the storage portion in the horizontal direction.

The outer surface of the cut storage portion was held between fingers and pressed five times.

Then, the container was further rotated 90 degrees, and the outer surface of the storage portion was held between fingers in a direction orthogonal to the direction of the first five times and pressed five times.

Thereafter, the peeling state between the first layer and the second layer was visually observed.

Ten containers were tested, and the results were determined according to the following criteria.

The results are listed in Table 1.

○: No inter-layer peeling was observed in all ten containers.

X: Inter-layer peeling was observed in one or more containers.

Evaluation 3: Ease of Pressing

The lid of the resin container with purified water sealed inside was twisted off as in Evaluation 2, and the outlet was opened.

The outlet was pointed vertically downward, and the side surfaces of the storage portion were pressed with fingers to discharge the purified water.

The purified water was discharged until no water remained.

Three examiners performed two evaluations.

The first evaluation was performed by discharging the purified water in drops.

The second evaluation was performed by pressing the storage portion with more force than in the first evaluation and discharging the purified water as a continuous stream or dispensing drops of the purified water at a faster speed than that in the first evaluation. The ease of pressing was evaluated according to the following evaluation criteria.

The results are listed in Table 1.

○: The purified water was easily discharged in both the first and second evaluations.

Δ: The purified water was easily discharged in either the first or second evaluation.

X: The purified water was not easily discharged or was unable to be completely discharged in both the first and second evaluations.

Evaluation 4: Moldability

A connected body with purified water sealed inside was manufactured as in Evaluation 1, and the resin containers were separated with fingers. The lid of the resin container was twisted off to form an opening, and the purified water was discharged.

The appearance was observed, and evaluation was performed based on the presence of a fisheye.

A fisheye indicates a state in which a small granular is present in the resin and an area where the small granular is present has a different refractive index to the surrounding area, and this causes optical non-uniformity.

Subsequently, with the outlet of the resin container pointing upward, a utility knife was used to cut the storage portion in the horizontal direction.

The storage portion of the container was observed from the cut surface, and whether the wall thickness was non-uniform was evaluated.

Ten containers were tested, and the results were determined according to the following criteria.

The results are listed in Table 1.

○: For all ten containers, there were no fisheyes and no non-uniformity was observed in the wall thickness.

X: For one or more containers, there was a fisheye and/or non-uniformity was observed in the wall thickness.

Evaluation 5: Component Preservation

Resin containers were manufactured as in Evaluation 1 except that 0.5 mL of an 1-Menthol 0.03% aqueous solution was used instead of purified water.

The resin containers were separated by fingers one by one.

The containers were stored at 60° C. for two weeks and then cooled to room temperature.

100 mL of the stored chemical solution was removed and smelled for the 1-Menthol.

As an object of comparison, a glass ampoule tube with a capacity of 1 mL was filled with 0.5 mL of an 1-Menthol 0.03% aqueous solution and sealed, and the chemical solution of 100 mL after being stored at 60° C. for two weeks was smelled for the 1-Menthol.

Evaluation was performed according to the following evaluation criteria.

The results are listed in Table 1.

○: The 1-Menthol smell remained to a similar degree as the object of comparison.

Δ: The 1-Menthol smell was not as strong as that of the object of comparison, but a sufficiently good smell was detected.

X: The 1-Menthol smell was hardly detected.

As can be seen from the foregoing, the resin container of the present invention is a resin container with good moldability in which inter-layer peeling does not occur. Furthermore, it is clear that the connected body is easy to separate, the liquid content is easy to expel, and preservation of the liquid content is excellent.

REFERENCE SIGNS LIST

1 Resin container
10 Container body
11 Storage portion
12 Outlet
13 Nozzle portion
14 Holding portion
20 Lid

The invention claimed is:

1. A resin container, comprising:
   a container body including a storage portion configured to store liquid content and an outlet for the liquid content; and
   a lid configured to seal the container body by blocking the outlet,
   wherein the container body and the lid are made of a resin,
   the container body has a multilayer structure including a first layer being an innermost layer that comes into contact with the liquid content and a second layer that is in contact with the first layer from an outer side of the first layer,
   the first layer includes a cyclic olefin copolymer and a linear low-density polyethylene resin, with more of the cyclic olefin copolymer being included than the linear low-density polyethylene resin, and
   the second layer includes a low-density polyethylene resin,
   a main monomer of the linear low-density polyethylene resin is an ethylene,
   a comonomer of the linear low-density polyethylene resin introduces a short chain branch in the molecular structure, and
   the short chain branch is introduced at a ration of from 5 to 100 per 1000 units of structural units of the ethylene.

2. The resin container according to claim 1,
   wherein the resin container includes the lid and the container body that are integrally formed, and the resin container is configured to be broken between the lid and the container body.

3. The resin container according to claim 1,
   wherein the container body has a capacity ranging from 0.1 ml to 10 mL.

4. The resin container according to claim 1,
   wherein the resin container is a drop-dispensing container configured to dispense drops of the liquid content from the outlet.

5. The resin container according to claim 1,
   wherein the first layer has a glass transition temperature ranging from 60° C. to 130° C.

6. The resin container according to claim 1,
   wherein a proportion of the linear low-density polyethylene resin with respect to a total amount of the cyclic olefin copolymer and the linear low-density polyethylene resin in the first layer ranges from 5 mass % to less than 50 mass %.

7. The resin container according to claim 1,
   wherein the linear low-density polyethylene resin includes 1-hexene as a comonomer.

8. The resin container according to claim 1,
   wherein the low-density polyethylene resin included in the second layer has a density ranging from 910 kg/m$^3$ to 930 kg/m$^3$.

9. The resin container according to claim 1,
   wherein the low-density polyethylene resin included in the second layer has a melt mass flow rate ranging from 0.1 g/10 min to 1.5 g/10 min.

10. A resin container connected body, comprising:
    a connected body having a configuration in which a plurality of the container bodies of the resin containers according to claim 1 are connected together,
    wherein, in the connected body, a plurality of the container bodies are disposed side by side with an opening direction of the outlet facing upward, and the resin containers adjacent to each other are connected via a connecting portion provided on side edge portions of the resin containers, and
    the connected body is an integrally formed article, and each one of the resin containers is configured to be separated by breaking the connecting portion.

* * * * *